US006947153B1

(12) United States Patent
Cabana et al.

(10) Patent No.: US 6,947,153 B1
(45) Date of Patent: Sep. 20, 2005

(54) METHOD AND APPARATUS FOR OPTIMIZED IMAGE PROCESSING

(75) Inventors: Glenn Edward Cabana, Derry, NH (US); Charles Francis Hunt, Hampstead, NH (US); Phillip Edward Ouellette, Hudson, NH (US); Dwayne Thomas Jeffrey, Amherst, NH (US)

(73) Assignee: Presstek, Inc., Hudson, NH (US)

( * ) Notice: Subject to any disclaimer, the term of this patent is extended or adjusted under 35 U.S.C. 154(b) by 950 days.

(21) Appl. No.: 09/716,729

(22) Filed: Nov. 20, 2000

(51) Int. Cl.[7] ............................................. G06F 15/00
(52) U.S. Cl. ....................... 358/1.1; 358/1.15; 358/450
(58) Field of Search ........................ 358/1.1, 1.11, 1.12, 358/1.13, 1.14, 1.15, 450, 462, 540, 1.4, 358/1.5

(56) References Cited

U.S. PATENT DOCUMENTS

| | | |
|---|---|---|
| 4,069,511 A | 1/1978 | Lelke |
| 4,131,916 A | 12/1978 | Landsman |
| 4,393,387 A | 7/1983 | Kitamura |
| 4,438,444 A | 3/1984 | Komada et al. |
| 4,574,291 A | 3/1986 | Wimmer |
| 4,591,880 A | 5/1986 | Mitsuka |
| 4,652,159 A | 3/1987 | Nagai |
| 4,707,683 A | 11/1987 | Yao |
| 4,718,340 A | 1/1988 | Love, III |
| 4,721,969 A | 1/1988 | Asano |
| 4,729,310 A | 3/1988 | Love, III |
| 4,731,622 A | 3/1988 | Hicks et al. |
| 4,745,487 A | 5/1988 | Nishikawa |
| 4,801,950 A | 1/1989 | Frehling |
| 4,819,018 A | 4/1989 | Moyroud |
| 4,827,279 A | 5/1989 | Lubinsky et al. |
| 4,829,326 A | 5/1989 | Emmett et al. |
| 4,893,135 A | 1/1990 | Jamzadeh |
| 4,911,075 A | 3/1990 | Lewis et al. |
| 4,919,047 A | 4/1990 | Inouye et al. |
| 4,936,211 A | 6/1990 | Pensavecchia et al. |
| 4,954,863 A | 9/1990 | Harada et al. |
| 4,962,385 A | 10/1990 | Zlotek |
| 5,005,479 A | 4/1991 | Lewis |
| 5,014,618 A | 5/1991 | Zingher et al. |
| 5,174,205 A | 12/1992 | Kline et al. |
| 5,860,149 A | 1/1999 | Fiacco et al. ............... 711/209 |

(Continued)

FOREIGN PATENT DOCUMENTS

EP         0038497 A2    10/1981

(Continued)

OTHER PUBLICATIONS

Optronics 5040 Scanner/Plotter User's Guide (1989-90).

(Continued)

*Primary Examiner*—Mark Wallerson
(74) *Attorney, Agent, or Firm*—Goodwin Procter LLP

(57) ABSTRACT

An image processing system for digital printing for improving throughput and efficiency of the transfer of image data to imaging devices, such as lasers, while allowing for dynamic and continuous adjustment of image size and registration (i.e., alignment) on recording media. A buffer memory structure is configured to receive data from raw image files. Specific portions of data are copied from the raw image files into a buffer memory structure and, for compilation of the final image, into an image buffer. Image overlap is resolved by copying data into the image buffer according to a defined hierarchy. Using a phase locked loop, image size and registration are adjusted to optimize the appearance of the final image on the recording medium. The optimization is performed dynamically and continuously, thereby providing a uniform final image. Many aspects of the operation of the image processing system may be under the control of a digital computer.

32 Claims, 3 Drawing Sheets

U.S. PATENT DOCUMENTS

| | | | | |
|---|---|---|---|---|
| 6,061,733 | A | * | 5/2000 | Bodin et al. ................ 709/233 |
| 6,128,416 | A | | 10/2000 | Oura |

FOREIGN PATENT DOCUMENTS

| | | |
|---|---|---|
| EP | 0038497 B1 | 10/1981 |
| EP | 0130028 | 1/1985 |
| EP | 0167352 | 6/1986 |
| EP | 0 570 146 A1 | 11/1993 |
| EP | 0 881 820 A2 | 12/1998 |
| JP | 63-151264 | 6/1988 |
| JP | 9 035 073 A | 2/1997 |
| WO | 98/12865 | 3/1998 |

OTHER PUBLICATIONS

Optronics 5040 Scanner/Plotter Installation and Maintenance Manual (1989-90).

Samuelsson. "Ink Jet Printing of Color Images." Report Aug. 1985 (Dept. of Electrical Measurements, Lund Institute of Technology)(1985).

LogEscan Service and Maintenance Manual, Model 2417. pp. II-7 and II-33.

Excerpt from ANPA News, Jun. 7, 1980.

LogEscan, Model 2417 brochure (1987).

Benzing, "Pioneering Developments in Laser Platemaking Systems." *Proc. Of 1983 Lasers in Graphics Electronic Publishing in the '80s.*

Lasercomp Interface Manual (1981).

Landsman. "Design and Use of Thermal Imaging Systems for the Graphics Arts." *Proc. Of Soc. Of Photo-Optical Instrumentation Engineers (1979).*

Toyen, G. "Generation of Precision Pixel Clock in Laser Printers and Scanners". SPIE, vol. 84 pp. 138-145. 1976.

Laser Scanning Components & Techniques.

Landsman, R.M. "Design and Use of Thermal Imaging Systems for the Graphic Arts". SPIE. vol. 169. pp. 71-77. 1979, Laser Printing.

Mead, C. and Lynn Conway *Introduction to VLSI Systems*, pp. 259-260. 1980. Addison-Wesley Publishing Company, Inc., Don Mills, Ontario.

Partial European Search Report EP 01 30 9747 dated Sep. 9, 2004.

PRESSTEK News Release, Mar. 6, 2000, "Presstek Previews DRUPA 2000 Products".

PRESSTEK News Release, May 19, 2000, "Ryobi Limited And Presstek, Inc. Announce The Ryobi 3404DI".

PRESSTEK News Release, Jun. 6, 2000, "Presstek Announces Industry Interest in Drupa Product Offerings".

PRESSTEK News Release, Jun. 6, 2000, Presstek Announces Formation of Laser Manufacturing Subsidiary.

On-Press DI® Solutions.

PRESSTEK 2000 Annual Report.

Assessment of Short-run Color Options.

Fueled With Optimism and DI Technology Start-Up ZOOOM Printing Zooms Ahead.

DI Technology's Impact on the Print Industry, Jun. 2002.

Quarterly Profile, First Quarter 2003.

Quarterly Profile, Third Quarter 2003.

Pressing On, Manufacturer, Jan. 2003.

TechTrends, Mega Trends Are Spurring Growth Of Direct Imaging.

Waterless Currents, Presstek Fires Up DI Market, Sep. 2000.

American Printer, DI presses, Feb. 2002.

More profits, Digital demand, vol. 3, iss. 1.

The direct route, Digital demand, vol. 2, iss. 1.

DI Printing—A Good Model for Profitable Offset Printing, 2004.

"Capitalization on Digital Technology", Photonics Spectra, Nov. 2001.

"A matter of dollar & sense", American Printer.

PRESSTEK, INC., 2001 Annual Report.

PRESSTEK, INC., 2002 Annual Report.

PRESSTEK, INC., 2003 Annual Report.

European Search Report F071089PEP dated Dec. 22, 2004.

* cited by examiner

METHOD AND APPARATUS FOR OPTIMIZED IMAGE PROCESSING

FIELD OF THE INVENTION

The present invention relates generally to digital printing methods and apparatus and, more specifically, to methods and apparatus for improving the compilation of image data and optimizing the accuracy of rendered images.

BACKGROUND OF THE INVENTION

Various methods and technologies exist for encoding documents digitally and transferring the digital representations to output devices. At the encoding stage, these range from hobbyist scanners and associated software to elaborate prepress systems. These systems have replaced traditional "cut and paste" approaches to layout, which required painstaking manual arrangement of the various document components—text, graphic patterns and photographic images—onto a white board for subsequent reproduction. Instead, designers can now manipulate all of these components at once using computers.

Output of the digitally encoded documents can take numerous forms, ranging from laser printing to digital exposure of photographic films to transfer of the image to lithographic plates for subsequent mass-quantity printing. In the latter case, the image to be printed is present on a plate or mat as a pattern of ink-accepting (oleophilic) and ink-repellent (oleophobic) surface areas. In a dry printing system, the plate is simply inked and the image transferred onto a recording material; the plate first makes contact with a compliant intermediate surface called a blanket cylinder which, in turn, applies the image to the paper or other recording medium. In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

Lithographic plates can be fabricated in various ways, ranging, once again, from traditional manual techniques involving photoexposure and chemical development to automated procedures involving computer control. Computer-to-plate systems can utilize pulses of electromagnetic radiation, produced by one or more laser or non-laser sources, to create physical or chemical changes at selected points of sensitized plate blanks (which, depending on the system, may be used immediately or following conventional photo-development); ink-jet equipment used to selectively deposit ink-repellent or ink-accepting spots on plate blanks; or spark-discharge equipment, in which an electrode in contact with or spaced close to a plate blank produces electrical sparks to alter the characteristics of certain areas on a printing surface, thereby creating "dots" which collectively form a desired image. As used herein, the term "imaging device" includes radiation sources (e.g., lasers), ink-jet sources, electrodes and other known means of producing image spots on blank printing plates, and the term "discharge" means the image-forming emissions produced by these devices. The term "image" refers to a lithographic representation of the final document to be reproduced. The term "plate" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

A second approach to laser imaging involves the use of transfer materials. See, e.g., U.S. Pat. Nos. 3,945,318; 3,962,513; 3,964,389; 4,245,003; 4,395,946; 4,588,674; and 4,711,834. With these systems, a polymer sheet transparent to the radiation emitted by the laser is coated with a transferable material. During operation the transfer side of this construction is brought into contact with an acceptor sheet, and the transfer material is selectively irradiated through the transparent layer. Typically, the transfer material exhibits a high degree of absorbence for imaging laser radiation, and ablates—that is, virtually explodes into a cloud of gas and charred debris—in response to a laser pulse. This action, which may be further enhanced by self-oxidation (as in the case, for example, of nitrocellulose materials), ensures complete removal of the transfer material from its carrier. Material that survives ablation adheres to the acceptor sheet.

Alternatively, instead of laser activation, transfer of the thermal material can be accomplished through direct contact. U.S. Pat. No. 4,846,065, for example, describes the use of a digitally controlled pressing head to transfer oleophilic material to an image carrier.

To create a printing plate, the transfer and acceptor materials are chosen to exhibit different affinities for fountain solution and/or ink, so that removal of the transparent layer together with unirradiated transfer material leaves a suitably imaged, finished plate.

Another important application of transfer materials is proofing. Graphic-arts practitioners use color proofing sheets (or simply "color proofs") to correct separation images prior to producing final separation plates, as well as to evaluate the color quality that will be obtained during the printing process. In typical printing processes, multicolor images cannot be printed directly using a single printing plate. Rather, composite color images are first decomposed into a set of constituent color components, or "separations", each of which serve as the basis for an individual plate. The colors into which the multicolor image is decomposed depends on the particular "color model" chosen by the practitioner. The most common color model is based on cyan, magenta, yellow and black constituents, and is referred to as the "CMYK" color model. If the separation is performed properly, subtractive combination of the individual separations produces the original composite image. A color proof represents, and permits the practitioner to view, the final image as it will appear when printed.

A color proof may be produced by irradiative transfer of a coloring agent, corresponding to one of the separation colors, onto a transparent acceptor sheet according to the distribution of that color in the final image. Transfer sheets corresponding to each color of the model can be applied to a single acceptor sheet and sequentially imaged, producing a single-sheet proof. Alternatively, a set of color proofs each corresponding to one of the colors may be superposed on each other in registration, thereby revealing the final image.

Mechanically, laser-based imaging systems can take a variety of forms. Laser output may be provided directly to the surface of a substrate via lenses or other beam-guiding components, or transmitted to the surface from a remotely sited laser using a fiber-optic cable. A controller and associated positioning hardware maintains the beam output at a precise orientation with respect to the substrate surface, scans the output over the surface, and activates the laser at positions adjacent selected points or areas of the substrate.

The controller responds to incoming image signals corresponding to the original document or picture being copied onto the substrate to produce a precise negative or positive image of that original. The image signals are stored as a bitmap data file or other suitable image format on a data storage device. Such files may be generated by a raster image processor (RIP) or other suitable means. For example, a RIP can accept input data in page-description language, which defines all of the features required to be transferred onto the substrate, or as a combination of page-description language and one or more image data files. The bitmaps are constructed to define the hue of the color as well as screen frequencies and angles.

The imaging apparatus can be configured as a flatbed recorder or as a drum recorder, with the substrate mounted to the interior or exterior cylindrical surface of the drum. In the case of lithographic printing, the exterior drum design is more appropriate to use in situ, on a lithographic press, in which case the print cylinder itself constitutes the drum component of the recorder or plotter.

In the drum configuration, the requisite relative motion between the laser beam and the substrate is achieved by rotating the drum (and the substrate secured thereon) about its axis and moving the beam parallel to the rotation axis, thereby scanning the substrate circumferentially so the image "grows" in the axial direction. Alternatively, the beam can move parallel to the drum axis and, after each pass across the substrate, increment angularly so that the image on the substrate "grows" circumferentially. In both cases, after a complete scan by the beam, an image corresponding (positively or negatively) to the original document or picture will have been applied to the surface of the substrate.

Multiple imaging devices may be used to produce several lines of image spots simultaneously, with a corresponding increase in imaging speed. Regardless of the number of imaging devices used, their operation must be precisely controlled so that the discharges occur at the appropriate times to reach the intended dot locations on the printing surface. Each discharge source must be aligned with the substrate along longitudinal and lateral dimensions (corresponding to circumferential and axial directions in the case of drum imaging) at all points during a scan of the all candidate image points on the substrate, and, in the case of laser-based imaging, the beam must remain focused on the substrate for maximum energy-transfer efficiency.

The overall efficiency of the imaging apparatus is an important operational criterion. Operational bottlenecks degrade the performance of the apparatus resulting in, for example, a slowdown in the production of the lithographic plates. In laser-based imaging systems, the bottlenecks can preclude operation at commercially realistic imaging rates. One typical bottleneck relates to the acquisition of image data stored, as described above, as a bitmap file on a data storage device. The imposition (i.e., combination) of multiple bitmaps during the imaging output process compounds this problem.

Another bottleneck is encountered when the imaging apparatus uses a "combed array" of laser imaging devices. In this configuration, multiple laser imaging devices are distributed across a dimension of the substrate. This distribution can be as simple as a linear array where each imaging device is equidistant from the next. Alternatively, groups of imaging devices may be clustered into one or more "packs" where the spacing between the devices within a pack differs from the spacing between adjacent packs. Irrespective of the configuration, each imaging device, depending on its physical location within the array, is responsible for imaging a different portion of the overall image. The bottleneck occurs because the imaging devices operate simultaneously and the data required by each imaging device typically comes from different positions within the bitmap file. Consequently, multiple mass storage transactions (i.e., reads and seeks) are performed on the file to acquire the needed data from several non-contiguous locations within the file.

One way to optimize data flow to the imaging devices has been to include buffer memory in the imaging apparatus. The buffer memory may, for example, be configured as one or more buffer pairs; the imaging devices read data from only one of each pair (e.g., the "A Buffer"). While the imaging devices are reading the data in "A Buffer", the other member of the pair (e.g., the "B Buffer") is receiving data from the data storage device. When the imaging devices exhaust the data in the "A Buffer", they begin to read data from the "B Buffer". Simultaneously, the "A Buffer" once again begins to receive data from the data storage device. The roles of the "A Buffer" and "B Buffer" reverse again when the imaging devices exhaust the data in the "B Buffer". This process continues until the entire image is processed.

The role reversal of the "A" and "B" buffers improves data throughput and efficiency, but it does not address the delay time inherent in accessing image data from a number of different files or accessing image data from a number of files using a combed array of imaging devices. Retrieving these files, which are typically stored on mass storage media, entails additional overhead associated with accessing the media. This overhead degrades the efficiency of the imaging apparatus. Furthermore, as the number of files or retrieval requests increase, the total overhead grows, further slowing the imaging apparatus.

During the operation of imaging apparatus, it is also important to maintain image "registration" (i.e., alignment) along all relevant dimensions. Failure to do so results in imaging inaccuracies or undesirable artifacts, or both, that detract from the final image appearance. The consequences can be particularly acute in planographic printing contexts, since typical print jobs require sequential application of ink from several plates resulting in a cumulative aggregation of the imperfections associated with each plate. Laser imaging imposes especially demanding requirements, since adjustments along each of the relevant dimensions can result in introduction of distortions along the other dimensions.

Manufacturing tolerances also produce variations in the dimensions (e.g., circumferences) of the printing plate cylinders. Thus, there is a likelihood that in a four-color imaging system which incorporates four separate cylinders (each which is paired with its own set of imaging devices) the four circumferences will not be the same. Accordingly, adjustments must be made to the operation of the imaging devices in order to produce four printing plates whose images are the same size in the circumferential direction.

From the foregoing, it is apparent that there is still a need for a way to increase the efficiency of imaging apparatus while simultaneously optimizing image accuracy.

SUMMARY OF THE INVENTION

The present invention facilitates increased throughput between raw image data files and the imaging devices that will ultimately apply a complete image onto recording medium. This increases the speed and efficiency of the overall imaging apparatus. Furthermore, the invention allows for the adjustment of image dimensions, providing a dynamic "stretch" and "shrink" capability. This permits correction of registration errors caused by, for example, variations in cylinder diameters and speed, and also affords general control over image size. The invention represents a simple and effective way to optimize the operation of imaging equipment.

In one embodiment, a final image is compiled from two or more raw image data files, each file containing one or more portions of the final image. In this embodiment, a buffer memory structure is organized to include at least one buffer memory pair for each of the raw image data files. The memory structure also has at least one resultant image buffer memory for storing all or part of the data from the final bitmap image to be transferred to the recording medium. The resultant image buffer memory can be organized to include at least one buffer memory pair. Alternatively, it can be organized as one large memory. In any event, all memory is organized to ensure image data are always available for the efficient operation of the imaging apparatus.

During operation, the portion or portions of the data from each raw image file that will ultimately appear in the final image are identified; these portions are herein referred to as "pertinent segments". Image data corresponding to the pertinent segments is buffered into the buffer memory pair dedicated to that file. Consequently, only the pertinent segments are copied from the dedicated buffer memory pairs into the resultant image buffer memory. Successive copying from each raw image file into the dedicated buffer memory pairs and into the resultant image buffer memory results in a complete representation of the final image on the recording medium.

An advantage of copying data from the raw image data files into separate and dedicated buffer memory pairs is evident with respect to data extraction speed. Typically, the raw image data files reside on data storage devices, such as mass storage media. Associated with mass storage media are data seek and read times. These times affect transactions with the mass storage media and contribute to an "overhead" that slows access to the data. During the compilation of the final image, it is necessary to retrieve data from several files—often with multiple accesses to the same file or files—as the pertinent segments are accessed and copied into the resultant image buffer. Consequently, the total overhead for compiling the entire, final image (e.g., the overhead per mass storage transaction multiplied by the number of transactions) can be large. This degrades system throughput and efficiency. Because the buffer memory pairs do not have the overhead of mass storage media, data seek and read times for the former are greatly reduced. Thus, by first reading pertinent segments from the raw image data files into the buffer memory pairs (involving only one or a few mass storage transactions) and extracting the data for individual devices from the buffer memory pairs rather than from the mass storage media, the number of mass storage accesses is substantially decreased, and overall throughput and efficiency are correspondingly increased.

In some instances, pertinent segments from two or more raw image data files can "overlap" in the final image. This can occur, for example, when overlaying titles or other characters onto a photograph: the title image could be one pertinent segment and the photographic image another pertinent segment. When image overlap occurs, it must be determined which pertinent segment or segments will predominate over the others. Each pertinent segment that predominates is said to "occlude" the other pertinent segment or segments that it overlies. To manage such an event, an embodiment of the invention first determines that an overlap exists and then ascertains which pertinent segment predominates. Then, the data from the predominating pertinent segment (but not the corresponding data from the occluded segment or segments) is copied from its buffer memory pair into the resultant image buffer memory.

In another embodiment, the invention uses an "opaque ink" model to determine the predominating pertinent segment. In this embodiment, all data from the buffer memory pairs representing pertinent segments is successively copied, segment by segment, into the resultant image buffer memory. Image overlap is handled by allowing the later copied data to overwrite the earlier copied data; in other words, the opaque ink model operates temporally, with each successively copied image segment predominating over its predecessor. As a result, the data last copied to the resultant image buffer memory represents the predominating pertinent segment that is ultimately imaged onto the recording medium.

One advantage of controlling image overlap by using predominating pertinent segments is the ability to include different printing jobs on a single output medium, such as a lithographic plate. For example, a system according to the invention may apply onto a single plate, without overlap, the images from two unrelated printing jobs, each of which requires the same stock. This allows both printing jobs to be completed at once, thereby improving operational efficiency and providing cost savings.

In another embodiment, the invention builds on the approach to compiling a final image described above. In this embodiment, at least two imaging devices and a recording medium are provided. The imaging devices can be, for example, lasers as described in U.S. Pat. No. 5,351,617, assigned to the assignee of the present invention, and incorporated herein by reference. Further, the recording medium can be, by way of example, lithographic plates as described in U.S. Pat. No. 5,339,737, Reissue No. 35,512, and U.S. Pat. No. 5,783,364, all assigned to the assignee of the present invention, and also incorporated herein by reference. The imaging devices and recording medium are placed in relative motion. During this motion, the imaging devices are activated in accordance with the data in the resultant image buffer memory. (As described above, the data in the resultant image buffer memory is a compilation of the pertinent segments and, as required, the predominating pertinent segments.) Consequently, the recording medium, after exposure to the imaging devices, has applied to it a representation of the data in the resultant image buffer.

Typically associated with each imaging device is an "imaging zone." This zone is the region on the recording medium that is scanned by a particular imaging device. In one example, the imaging devices take the form of a linear array and the recording medium is rotated on a drum or cylinder. The array of devices extends axially along the cylinder, so that rotation of the cylinder causes each device to scan a circumferential line along the recording medium. After each complete rotation the array is indexed axially, so that the devices scan adjacent lines. This process of scanning and axial advancement continues until the entire image region of the recording medium has been fully scanned. (The process of scanning and axial advancement may also occur concurrently in a helical scan implementation of each imaging device, whereby the imaging devices are in constant motion across the recording medium.) At this point each device has scanned an imaging zone whose axial extent is equal to the spacing between adjacent imaging devices (and also represents the total distance that the array as a whole been indexed).

It is not uncommon for one dimension (e.g., the "width") of a pertinent segment to span several imaging zones. When this occurs, one embodiment of the invention determines, after defining the imaging zone for each imaging device, which imaging zones are spanned by the pertinent segments. This embodiment provides a pair of memory buffers for each such zone (whether spanned in whole or in part). Thus, instead of having one buffer memory pair for each raw image data file, this embodiment provides one buffer memory pair for each imaging device needed by each raw image data file. Data from each raw image file is then buffered into the buffer memory pairs dedicated to the required imaging devices for that file. This method of providing additional buffer memory pairs further improves raw image data throughput.

In one version of this embodiment, the invention includes an imaging apparatus having two or more imaging devices, a support for a recording medium, and a device to provide relative motion between the imaging devices and the support. This embodiment also includes a buffer memory structure having at least one buffer memory pair, a resultant image buffer, a control unit, and a drive unit. The control unit communicates with the buffer memory structure and the resultant image buffer, copying selected portions of data in the former into the latter. Note that these selected portions can be pertinent segments or, as required, predominating pertinent segments (both defined above) that the control unit had identified. The drive unit communicates with the control unit, the resultant image buffer, and the imaging devices. A purpose of the drive unit is to activate, during scanning, the proper imaging devices in accordance with the data in the resultant image buffer. The result is application of an image onto the recording medium corresponding to the data in the resultant image buffer. In a further embodiment, the control unit, the drive unit, or both, may be a digital computer.

In another embodiment, the invention optimizes an image through adjustment of the size and resolution of the image. In this embodiment, a raw position signal is generated that indicates the position of the imaging devices with respect to the recording medium when they are in relative motion. Resolution enhancement and image size parameters are defined and multiply the raw position signal to generate a higher frequency "subpixel clock". An optimized position signal is generated by dividing the subpixel clock by at least one pixel prescaler, which, as described below, helps determine the size of the pixels. During the relative motion, the imaging devices are activated in accordance with image data at positions dictated by the optimized position signal rather than by the raw position signal. A result is that an optimized representation of the image data is applied onto the recording medium.

In a version of this embodiment, the invention provides image optimization apparatus having two or more imaging devices, a support for a recording medium, and a device to provide relative motion between the imaging devices and the support. This embodiment also includes a sensing system that determines the position of the imaging devices relative to the recording medium. Typically, this sensing system has a position encoder communicating with a phase locked loop. The phase locked loop responds to the signal produced by the position encoder, a resolution enhancement parameter, and image size parameter. Further, the phase locked loop generates a second signal, the frequency of which is determined by the resolution enhancement and image size parameters. In general, the second signal (the subpixel clock) reflects the multiplication of the encoder signal by the resolution enhancement and image size parameters. Because the frequency of subpixel clock is higher than the encoder signal frequency, this clock provides submicron resolution of pixel position on the recording medium.

The center-to-center distance between adjacent image pixels is fixed and equal to a specific number of subpixel clock pulses, as determined by the image resolution. The frequency of the subpixel clock is reduced by dividing it by at least one pixel prescaler. This allows the starting point of each pixel to be adjusted relative to the center point of that pixel. Essentially, this affects the actual size of an image data element or pixel output onto the recording medium.

Manufacturing or assembly tolerances may result in variations in orientation between the imaging devices. To compensate, an offset register responsive to the subpixel clock is provided for each imaging device to adjust the starting point of the latter. Each pixel prescaler (typically one for each imaging device) is associated with, and responsive to, the corresponding offset register. These registers communicate with their associated pixel prescalers and determine, for each column of pixels, the placement of the first pixel on the recording medium. In the case where the imaging apparatus is a drum recorder, the offset values are typically adjusted on every revolution of the recording medium to correct for baseline variations.

Also included in this version are a control unit, in communication with and responsive to the sensing system and image data, as well as at least one drive unit. The drive unit is in communication with the control unit and the imaging devices. The drive unit responds to the at least one pixel prescaler and its associated offset register and selectively activates the imaging devices during, and at specific locations of, the relative motion, in accordance with image data and the optimized position signal. The drive unit determines the shape and duration of the signal that activates each imaging device, but it cannot initiate the firing of that imaging device until enabled by the pixel prescaler. Consequently, the drive unit, in combination with the pixel prescaler, determines the overall pixel size. Indeed, it is possible for the drive unit to continue firing an imaging device as it crosses a boundary between pixel adjacent pixel regions.

Note that the position encoder may be an angular position encoder. One or more of the control unit, the drive unit, and the sensing system may be a digital computer.

Another embodiment of the invention includes both the buffering and optimization methods discussed above. Specifically, in this embodiment, at least two imaging devices and a recording medium are provided and placed in relative motion. Also provided is a buffer memory structure that has at least one buffer memory pair for each raw image data file. The memory structure also has a resultant image buffer memory. During operation, the pertinent segments or, as required, the predominating pertinent segments, of the data are identified. Corresponding image data from each raw image file is buffered into a dedicated buffer memory pair. Pertinent (or predominating pertinent) segments of data are copied from the dedicated buffer memory pairs into the resultant image buffer memory.

Also in this embodiment, a raw position signal is generated that indicates the position of the imaging devices with respect to the recording medium when they are in relative motion. Defined resolution enhancement and image size parameters multiply the raw position signal to generate the subpixel clock. An optimized position signal is generated by dividing the subpixel clock by at least one pixel prescaler, in cooperation with associated offset registers. During the relative motion, the imaging devices are activated in accordance with data in the resultant image buffer and the optimized position signal. A result is that an optimized representation of data in the resultant image buffer is applied onto the recording medium.

In a version of this embodiment, the invention provides image processing apparatus having two or more imaging devices, a support for a recording medium, and a device to provide relative motion between the imaging devices and the support. This embodiment also includes a buffer memory structure having at least one buffer memory pair, a resultant image buffer, a control unit, a drive unit, and a sensing system. The control unit communicates with the sensing system, the buffer memory structure, and the resultant image buffer. The control unit copies selected portions of data in the buffer memory structure into the resultant image buffer. Note that these selected portions can be pertinent segments or, as required, predominating pertinent segments. The sensing system determines the position of the imaging devices relative to the recording medium. As stated above, this sensing system typically has a position encoder communicating with a phase locked loop. The phase locked loop responds to the signal produced by the position encoder, a resolution enhancement parameter, and image size parameter. Further, the phase locked loop generates a second signal the frequency of which is determined by the resolution enhancement and image size parameters. In general, the second signal reflects the multiplication of the encoder signal by the resolution enhancement and image size parameters and division by at least one pixel prescaler.

The drive unit, also in communication with the control unit, the resultant image buffer and the imaging devices, responds to the at least one pixel prescaler and its associated offset register. The drive unit controls the shape and duration of the signal that activates the imaging devices, but will not activate the latter until enabled by the at least one pixel prescaler. Activation occurs during, and at specific locations of, the relative motion, in accordance with data in the resultant image buffer. This applies onto the recording medium an optimized representation of the image.

In any of the embodiments described above, one or more of the control unit, the drive unit, and the sensing system may be a digital computer. Consequently, one embodiment of the invention includes an article of manufacture that includes computer readable code for compiling image data and applying the corresponding image. The code includes portions for reading a raw image data file, buffering the contents of this file, identifying a pertinent segment from this file, copying the pertinent segment, and activating imaging devices to apply the corresponding image. In another embodiment, a program storage medium tangibly embodies a program of instructions executable by a computer to perform the method steps for the aforementioned compilation and application.

The image optimization described above may also be performed using a digital computer. In this case, an article of manufacture includes computer readable code for the optimized registration of image data. The code includes portions for generating a raw position signal, defining resolution enhancement and image size parameters, defining at least one pixel prescaler and an associated offset register, generating an optimized position signal, and activating imaging devices in accordance with the optimized position signal to register the corresponding image. In a further embodiment, a program storage medium tangibly embodies a program of instructions executable by a computer to perform the method steps for the aforementioned image optimization.

Other aspects and advantages of the present invention will become apparent from the following detailed description, taken in conjunction with the accompanying drawings, illustrating the principles of the invention by way of example.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1:
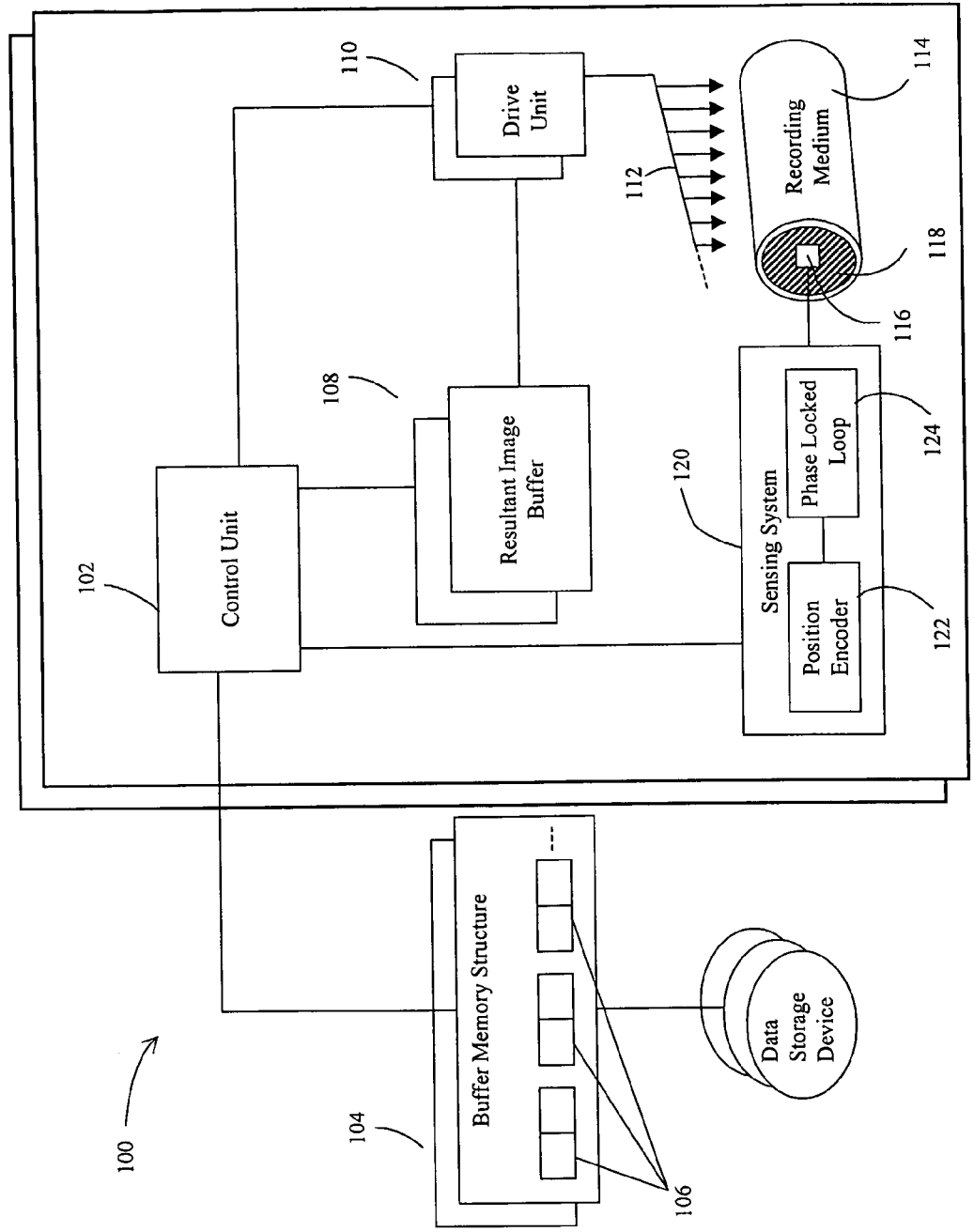
FIG. 1 is a block diagram of an image processing apparatus in accordance with an embodiment of the present invention.

As shown in the drawings for the purposes of illustration, the invention may be embodied in an image processing system. A system according to the invention increases operational efficiency and reduces or eliminates image registration errors.

An image processing apparatus according to the invention includes an improved buffer memory structure and, for dynamic image adjustment, a phase locked loop. The invention avoids the problems of degraded efficiency and image misalignment discussed above.

In the following detailed description and the drawings, like elements are identified with like reference numerals.

FIG. 1 shows a block diagram of an embodiment of an image processing apparatus 100. A typical printing press employs one or more imaging stations, each having a dedicated image processing apparatus 100. The image processing apparatus 100 includes a buffer memory structure 104, a resultant image buffer 108, and a drive unit 110, all in electrical communication with a control unit 102. The buffer memory structure 104 includes one or more buffer memory pairs 106. Although FIG. 1 shows only three buffer memory pairs 106, this is for clarity only. Any number of buffer pairs 106 is within the scope of the present invention. In one embodiment, one buffer memory pair 106 is provided for each raw image data file that is a component of the final image.

Figure 2:
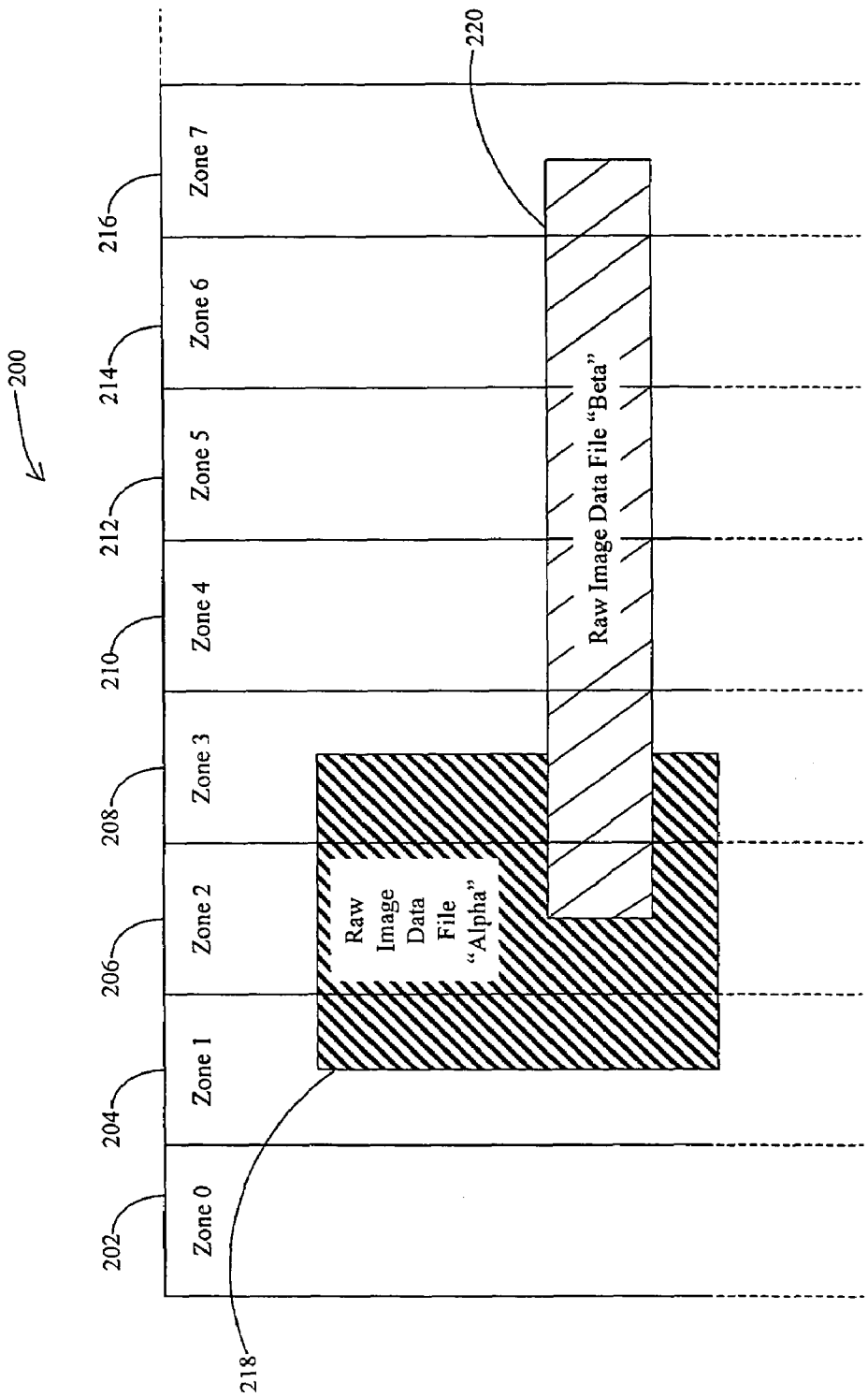
FIG. 2 is a schematic view of image zone buffers in accordance with an embodiment of the present invention.

In a further embodiment, one buffer memory pair 106 is provided for each imaging device 112 needed by each raw image data file. This is shown in FIG. 2, which details an image zone buffer structure 200. Each zone corresponds to one imaging device 112. For clarity, only eight zones are shown (zone 0 (202) through zone 7 (216)) in FIG. 2. Nevertheless, any number of zones is within the scope of the present invention.

In brief overview, FIG. 2 shows two raw image data files with dimensional extents (e.g., "width") that span several imaging zones. File "Alpha" (218) spans zone 1 (204) through zone 3 (208). File "Beta" (220) spans zone 2 (206) through zone 7 (216). In this example, three buffer memory pairs 106 are provided for file "Alpha" (218): one pair for each of the three zones file "Alpha" (218) spans. Likewise, six buffer memory pairs 106 are provided for file "Beta" (220): one pair for each of the six zones file "Beta" (220) spans. In this embodiment, one buffer pair 106 is provided for each zone spanned, in whole or part, by each raw image data file that is a component of the final image.

During operation, the contents of raw image data files are read into the buffer memory pairs 106. Depending on the total amount of memory available, part or all of each raw image data file may be read into the buffer memory pairs 106. If only part of a raw image data file is read into a buffer memory pair 106, it is preferable that the part be the portion within the zone associated with that buffer memory pair 106. Nevertheless, acquiring data from the entirety of each raw image data file into the buffer memory pairs 106 can be accomplished efficiently based on a single mass storage retrieval transaction, thereby reducing data access overhead.

Pertinent segments from each raw image data file are identified and copied from their locations in each data file into the buffer memory pairs 106 for further copying into the resultant image buffer 108. Alternatively, all or part of each raw image data file, including both pertinent and "non-pertinent" segments, may be copied into the buffer memory pairs 106. In this case, only the pertinent segments are extracted from the buffer memory pairs 106 and copied into the resultant image buffer 108.

There may be cases where there is an overlap of pertinent segments. An example of this is shown in FIG. 2 where file "Alpha" (218) and file "Beta" (220) overlap in zone 2 (206) and zone 3 (208). When there is an overlap, a predominating pertinent segment is identified. In this example, only one file, "Beta" (220), predominates in zone 2 (206) and zone 3 (208). (It is not necessary that the same file predominate in each zone.) The data representing the predominating pertinent segment, not the occluded segment or segments, is then copied into the resultant image buffer 108.

In one embodiment, the predominating pertinent segment is defined in accordance with an opaque ink model. In this embodiment, all data representing pertinent segments stored in the buffer memory pairs 106 is copied into the resultant image buffer 108. Image overlap is handled by allowing the later copied data to overwrite the earlier copied data. The data last copied to the resultant image buffer memory 108 therefore represents the predominating pertinent segment that is ultimately imaged onto a recording medium 114.

Also shown in FIG. 1 is a device to provide relative motion 116, e.g., a motor. Device 116 provides relative motion between the imaging devices 112 and a support for a recording medium 118. Because the recording medium 114 is attached to the support 118, the recording medium 114 is also in relative motion with the imaging devices 112. Although FIG. 1 shows the support 118 to be in the form of a drum and the recording medium 114 to be cylindrical in shape, other configurations are within the scope of the present invention. For example, the support 118 could be a flatbed-like structure and the recording medium 114 a planar surface. If desired, support 118 can be straightforwardly incorporated into the design of a conventional lithographic press, and serve as the plate cylinder of the press. Thus, the device 116 is the same motor that is used to rotate the print cylinder during printing. Alternatively, support 118 may reside on a stand-alone platesetting or proofing apparatus. In any configuration, the support 118 and recording medium 114 are shaped to fit closely.

The drive unit 110 is in electrical communication with the resultant image buffer 108 and the imaging devices 112. Again, for the purpose of clarity, only eight imaging devices 112 are shown in FIG. 1; but any number of imaging devices 112 is within the scope of the present invention. During operation, while the relative motion is underway, the drive unit 110 activates the imaging devices 112 in accordance with the data in the resultant image buffer 108. This applies to the recording medium 114 an "imagewise" representation of the data in the resultant image buffer 108.

Also shown in FIG. 1 is a sensing system 120 that is in electrical communication with the control unit 102. The sensing system 120 transmits to the control unit 102 the position of the support 118 (and, hence, the recording medium 114) relative to the imaging devices 112. The sensing system 120 includes a position encoder 122 and a phase locked loop 124. The position encoder 122 discerns the relative position between the recording medium 114 the imaging devices 112 during the relative motion between the two and generates an output signal that represents that position. This is referred to as a "raw position signal." In the case where the support 118 is in the form of a drum, rotating the recording medium 114 past the imaging devices 112, the position encoder 122 can be an angular encoder. The angular encoder would provide an output signal representing the angular position of the support 118 relative to the imaging devices 112.

Figure 3:
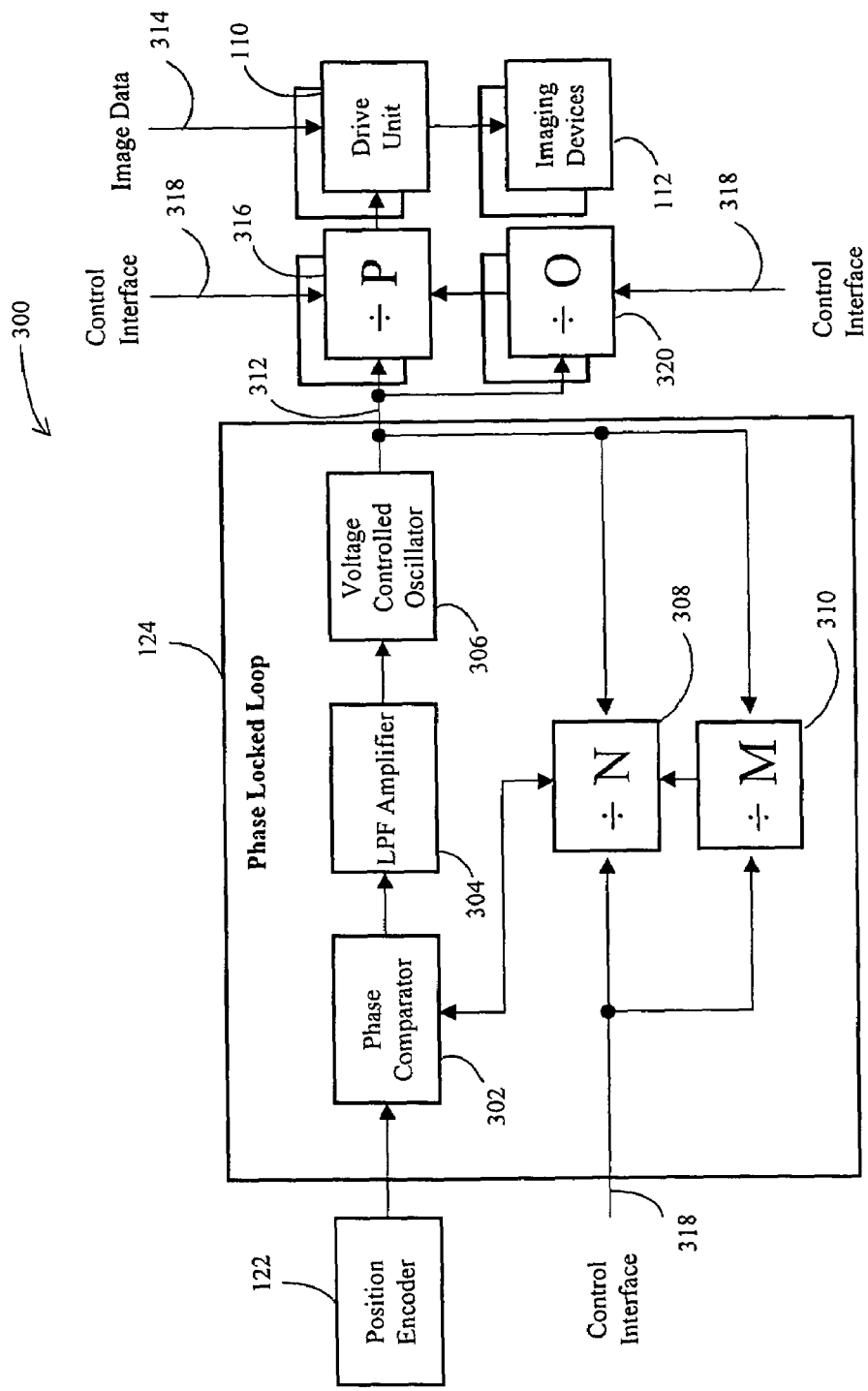
FIG. 3 is a block diagram of a phase locked loop clocking scheme in accordance with an embodiment of the present invention.

FIG. 3 shows a phase locked loop clocking scheme 300. The output signal of the position encoder 122 is supplied to a phase comparator 302 within the phase locked loop 124. The phase locked loop 124 includes a low pass filter-amplifier 304 and a voltage controlled oscillator 306. As is well known, a general purpose of any phase locked loop is to produce an output signal that is in phase with an input signal. As the phase of the input signal varies, a phase locked loop alters its output signal, causing the phase of the output signal to match that of the input signal. This is typically done by feeding back the output of the voltage controlled oscillator to an input of the phase comparator. In this embodiment, the voltage controlled oscillator output signal 312 that is fed back to the phase comparator 302 is first divided by an image size parameter 308 and a resolution enhancement parameter 310. An effect of this two-stage division is to change the frequency of the voltage controlled oscillator output signal 312. This changed frequency is related to the frequency of the output signal of the position encoder 122 multiplied by the image size parameter 308 and the resolution enhancement parameter 310. Furthermore, the voltage controlled oscillator output signal 312 remains in phase with the output signal of the position encoder 122.

In this embodiment, the frequency of the voltage controlled oscillator output signal 312 operates as a subpixel clock, providing a submicron resolution of pixel position on the recording medium 114. This signal 312 is then divided by at least one pixel prescaler 316. The at least one pixel prescaler 316, in communication with at least one associated offset register 320, is used to enable the drive unit 110. This allows adjustment of the start point of each pixel relative to its center point, thereby modifying the overall pixel size. The offset register 320 includes a division function similar to the pixel prescaler 316 and emits a single pulse. Consequently, the offset register 320 may be considered a "single pulse prescaler."

The rate at which the image data 314 are transferred to the imaging devices 112 can be changed by adjusting the frequency of the voltage controlled oscillator output signal 312 using the two-stage division described above. This allows for the adjustment of image size and resolution as rendered on the recording medium 114. For example, division by the resolution enhancement parameter 310 may increase the frequency of the voltage controlled oscillator output signal 312. This increased frequency allows the control unit 102 to discern smaller changes in the position of the recording medium 114 relative to the imaging devices 112. Consequently, the drive unit 110 may activate the imaging devices 112 at a greater frequency. A result is closer spacing between the discrete "dots," generated by the imaging devices 112, that form the complete image on the recording medium 114. This closer spacing gives the final image has an enhanced resolution compared to what would be obtained without multiplication.

In another example, division by the image size parameter 308 also changes the frequency of the voltage controlled oscillator output signal 312. This represents a dimensional "stretch" or "shrink" of the final image as rendered on the recording medium 114. This serves, for example, to adjust the final image for variations in drum or plate sizes due to manufacturing tolerances. Proper registration (i.e., alignment) is obtained by adjusting the size of the final image.

At least one offset register 320 that is responsive to the subpixel clock is used to compensate for variation in "starting line references" between the imaging devices 112. This occurs when one imaging device has a different orientation compared to another, typically due to manufacturing or assembly tolerances. Consequently, the discharge of a misoriented imaging device will have a trajectory that differs from other imaging devices. This results in the discharges not reaching dimensionally consistent dot locations on the recording medium, thereby distorting the image.

To compensate for differences in starting line references, one embodiment includes unique offset register 320 for each of the imaging devices 112. In this configuration, each imaging device 112 has a dedicated pixel prescaler 316 that is associated with a unique offset register 320. The offset register 320 communicates with its associated pixel prescaler 316 to enable the drive unit 110. Accordingly, the pixel prescaler 316 and drive unit 110 together determine the size of the dots actually applied. Proper choice of a value for the offset register 320 for each imaging device will compensate for variations in orientation. Furthermore, the pixel prescaler 316 operates on the voltage controlled oscillator output signal 312 after the effects of the image size parameter 308 and the resolution enhancement parameter 310. This distributes the effects of these parameters uniformly across the entire image.

Adjusting the frequency of the raw position signal by changing the values of the image size parameter 308 and the resolution enhancement parameter 310 creates a subpixel clock. An optimized position signal is generated by dividing the subpixel clock by the at least one pixel prescaler 316. These parameter and prescaler values, which may be whole or fractional numerical quantities, accomplish this adjustment by, in essence, frequency modulating the raw position signal. A user may select values for these parameters by employing, for example, registers or counters, and communicate these values using a control interface 318. Despite the discrete nature of the parameter values, the frequency modulation results in spreading their effect smoothly over the analog voltage controlled oscillator output signal 312. This incorporates the image size and enhancement adjustments smoothly and uniformly throughout image, with a result that is pleasing to the eye.

A further embodiment of the invention includes the additional feature of a digital computer performing the role or roles of one or more of the control unit 102, the drive unit 110, or the sensing system 120. Consequently, many of the actions described above, such as the buffering and image optimization, could be implemented in computer software, rather than in dedicated hardware. The reading of raw image data files, identification of image overlaps, copying of image data between buffers, and activating the imaging devices 112 could also be performed in software. Note that because FIG. 1 is a block diagram, the enumerated items are shown as individual elements. In actual implementations of the invention, however, they may be inseparable components of other electronic devices such as a digital computer.

From the foregoing, it will be appreciated that the image processing system provided by the invention affords a simple and effective way to ensure efficient system operation while preserving the proper image size and alignment. The problems of low system throughput, compounded by slow data access times, are largely eliminated.

The image processing system described above facilitates the dynamic control of image size and alignment. Consequently, unacceptable image registration errors are reduced or eliminated.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes which come within the meaning and range of equivalency of the claims are therefore intended to be embraced therein.

What is claimed is:

1. A method of compiling a resultant image, the method comprising the steps of:
   providing a plurality of raw image data files;
   providing a buffer memory structure comprising at least one buffer memory pair for each raw image data file;
   identifying at least one pertinent segment from each of the raw image data files, the at least one pertinent segment being part of the resultant image;
   buffering image data corresponding to the at least one pertinent segment from each raw image data file into the at least one buffer memory pair associated with the raw image data file; and
   copying the at least one pertinent segment from the associated at least one buffer memory pair into a resultant image buffer.

2. The method of claim 1, wherein the step of identifying the at least one pertinent segment further comprises the steps of:
   ascertaining the existence of at least one overlap of a plurality of pertinent segments in the resultant image;
   determining for each overlap a predominating pertinent segment having precedence in the resultant image; and
   classifying the predominating pertinent segment as the at least one pertinent segment.

3. The method of claim 1, further comprising the step of permitting the at least one pertinent segment to be overwritten within the resultant image buffer by a predominating pertinent segment in accordance with an opaque ink model.

4. A method of imaging, the method comprising the steps of:
   providing a plurality of raw image data files;
   providing a plurality of imaging devices;
   providing a recording medium;
   providing a buffer memory structure comprising at least one buffer memory pair for each raw image data file;
   causing relative motion between the imaging devices and the recording medium;
   identifying at least one pertinent segment from each of the raw image data files, the at least one pertinent segment being part of a resultant image;

buffering image data corresponding to the at least one pertinent segment from each raw image data file into the at least one buffer memory pair associated with the raw image data file;

copying the at least one pertinent segment from the associated at least one buffer memory pair into a resultant image buffer; and activating the imaging devices during the relative motion and in accordance with data in the resultant image buffer, thereby applying to the recording medium a representation of the data in the resultant image buffer.

5. The method of claim 4, wherein the step of providing a buffer memory structure further comprises the steps of:

defining an imaging zone for each imaging device;

determining which imaging zones are required to image each raw image data file; and providing, for each raw image data file, a buffer memory pair for each required imaging zone.

6. The method of claim 5, wherein the buffering step further comprises buffering image data corresponding to the at least one pertinent segment from each raw image data file into the buffer memory pair provided for each required imaging zone.

7. The method of claim 4, wherein the step of identifying at least one pertinent segment further comprises the steps of:

ascertaining the existence of at least one overlap of a plurality of pertinent segments in the resultant image;

determining for each overlap a predominating pertinent segment having precedence in the resultant image; and classifying the predominating pertinent segment as the at least one pertinent segment.

8. The method of claim 4, further comprising the step of permitting the at least one pertinent segment to be overwritten within the resultant image buffer by a predominating pertinent segment in accordance with an opaque ink model.

9. An imaging apparatus comprising:

a plurality of imaging devices;

a support for a recording medium;

a device to provide relative motion between the imaging devices and the support;

a buffer memory structure further comprising at least one buffer memory pair;

a resultant image buffer;

a control unit in electrical communication with the buffer memory structure and the resultant image buffer, the control unit operating so as to copy selected portions of data in the buffer memory structure into the resultant image buffer; and a drive unit in electrical communication with the control unit, the resultant image buffer and the imaging devices, the drive unit activating the imaging devices during the relative motion and in accordance with data in the resultant image buffer, thereby applying to the recording medium a representation of data in the resultant image buffer.

10. The imaging apparatus of claim 9, wherein at least one of the control unit or the drive unit further comprises a digital computer.

11. A method of image optimization, the method comprising the steps of:

providing image data;

providing a plurality of imaging devices;

providing a recording medium;

causing relative motion between the imaging devices and the recording medium;

generating a raw position signal indicative of the position of the imaging devices relative to the recording medium;

defining a resolution enhancement parameter;

defining an image size parameter;

defining at least one offset register;

defining at least one pixel prescaler responsive to the at least one offset register;

generating an optimized position signal by multiplying the raw position signal by the resolution enhancement and the image size parameters and dividing by the at least one pixel prescaler; and activating the imaging devices during the relative motion in accordance with the optimized position signal and the image data, thereby applying to the recording medium an optimized representation of the image data.

12. An image optimization apparatus comprising:

a plurality of imaging devices;

a support for a recording medium;

a device to provide relative motion between the imaging devices and the support;

a sensing system to determine the position of the imaging devices relative to the recording medium, the sensing system further comprising a position encoder and a phase locked loop, the position encoder generating a first signal indicative of the position, the phase locked loop responding to (i) the first signal, (ii) a resolution enhancement parameter and (iii) an image size parameter so as to generate a second signal, the second signal having a frequency determined by the resolution enhancement and image size parameters;

a control unit, responsive to the sensing system and to image data; and a drive unit in electrical communication with the control unit and the imaging devices, the drive unit responding to at least one pixel prescaler and selectively activating the imaging devices during the relative motion at locations corresponding to the image data, thereby applying to the recording medium an optimized representation of the image data.

13. The image optimization apparatus of claim 12, wherein the position encoder further comprises an angular position encoder.

14. The image optimization apparatus of claim 12, wherein the second signal indicates successive imaging positions and reflects multiplication of the first signal by the resolution enhancement parameter, the second signal thereby providing an enhanced position resolution relative to the first signal.

15. The image optimization apparatus of claim 12, wherein the second signal indicates successive imaging positions and reflects multiplication of the first signal by the image size parameter, the second signal thereby scaling image size.

16. The image optimization apparatus of claim 12, wherein the second signal is further divided by the at least one pixel prescaler.

17. The image optimization apparatus of claim 12, wherein at least one of the control unit, or the drive unit, or the sensing system further comprises a digital computer.

18. A method of image processing, the method comprising the steps of:

providing a plurality of raw image data files;

providing a plurality of imaging devices;

providing a recording medium;

providing a buffer memory structure comprising at least one buffer memory pair for each raw image data file;

causing relative motion between the imaging devices and the recording medium;

identifying at least one pertinent segment from each of the raw image data files, the at least one pertinent segment being part of a resultant image;

buffering image data corresponding to the at least one pertinent segment from each raw image data file into the at least one buffer memory pair associated with the raw image data file;

copying the at least one pertinent segment from the associated at least one buffer memory pair into a resultant image buffer;

generating a raw position signal indicative of the position of the imaging devices relative to the recording medium;

defining a resolution enhancement parameter;

defining an image size parameter;

defining at least one offset register;

defining at least one pixel prescaler responsive to the offset register;

generating an optimized position signal by multiplying the raw position signal by the resolution enhancement and the image size parameters and dividing by the at least one pixel prescaler; and activating the imaging devices during the relative motion in accordance with data in the resultant image buffer and the optimized position signal, thereby applying to the recording medium an optimized representation of the data in the resultant image buffer.

19. The method of claim 18, wherein the step of providing a buffer memory structure further comprises the steps of:
defining an imaging zone for each imaging device;
determining which imaging zones are required to image each raw image data file; and
providing, for each raw image data file, a buffer memory pair for each required imaging zone.

20. The method of claim 19, wherein the buffering step further comprises buffering image data corresponding to the at least one pertinent segment from each raw image data file into the buffer memory pair provided for each required imaging zone.

21. The method of claim 18, wherein the step of identifying at least one pertinent segment further comprises the steps of:
ascertaining the existence of at least one overlap of a plurality of pertinent segments in the resultant image;
determining for each overlap a predominating pertinent segment having precedence in the resultant image; and
classifying the predominating pertinent segment as the at least one pertinent segment.

22. The method of claim 18, further comprising the step of permitting the at least one pertinent segment to be overwritten within the resultant image buffer by a predominating pertinent segment in accordance with an opaque ink model.

23. An image processing apparatus comprising:
a plurality of imaging devices;
a support for a recording medium;
a device to provide relative motion between the imaging devices and the support;
a buffer memory structure further comprising at least one buffer memory pair;
a resultant image buffer;
a sensing system to determine the position of the imaging devices relative to the recording medium, the sensing system further comprising a position encoder and a phase locked loop, the position encoder generating a first signal indicative of the position, the phase locked loop responding to (i) the first signal, (ii) a resolution enhancement parameter and (iii) an image size parameter so as to generate a second signal, the second signal having a frequency determined by the resolution enhancement and image size parameters;
a control unit responsive to the sensing system and in electrical communication with the buffer memory structure and the resultant image buffer, the control unit operating so as to copy selected portions of data in the buffer memory structure into the resultant image buffer; and
a drive unit in electrical communication with the control unit, the resultant image buffer and the imaging devices, the drive unit responding to at least one pixel prescaler and operating so as to activate the imaging devices during, and at specific locations of, the relative motion, in accordance with data in the resultant image buffer, thereby applying to the recording medium an optimized representation of data in the resultant image buffer.

24. The image processing apparatus of claim 23, wherein the position encoder further comprises an angular position encoder.

25. The image processing apparatus of claim 23, wherein the second signal indicates successive imaging positions and reflects multiplication of the first signal by the resolution enhancement parameter, the second signal thereby providing an enhanced position resolution relative to the first signal.

26. The image processing apparatus of claim 23, wherein the second signal indicates successive imaging positions and reflects multiplication of the first signal by the image size parameter, the second signal thereby scaling image size.

27. The image processing apparatus of claim 23, wherein the second signal is further divided by the at least one pixel prescaler.

28. The image processing apparatus of claim 23, wherein at least one of the control unit, or the drive unit, or the sensing system further comprises a digital computer.

29. An article of manufacture comprising a program storage medium having computer readable program code embodied therein for causing the compilation of image data and application of a corresponding image, the computer readable program code in the article of manufacture including:
computer readable code for causing a computer to read contents of at least one raw image data file;
computer readable code for causing a computer to identify at least one pertinent segment from each of the raw image data files;
computer readable code for causing a computer to buffer image data corresponding to the at least one pertinent segment from each raw image data file into at least one buffer memory pair;
computer readable code for causing a computer to copy the at least one pertinent segment from the at least one buffer memory pair into a resultant image buffer; and
computer readable code for causing a computer to activate a plurality of imaging devices in accordance with data in the resultant image buffer, so as to achieve application of the corresponding image.

30. A program storage medium readable by a computer, tangibly embodying a program of instructions executable by the computer to perform method steps for the compilation of image data and application of a corresponding image, the method steps comprising:
reading the contents of at least one raw image data file;

identifying at least one pertinent segment from each of the raw image data files;

buffering image data corresponding to the at least one pertinent segment from each raw image data file into at least one buffer memory pair;

copying the at least one pertinent segment from the at least one buffer memory pair into a resultant image buffer; and activating a plurality of imaging devices in accordance with data in the resultant image buffer, so as to achieve application of the corresponding image.

31. An article of manufacture comprising a program storage medium having computer readable program code embodied therein for causing the optimized application of image data, the computer readable program code in the article of manufacture including:

computer readable code for causing a computer to generate a raw position signal;

computer readable code for causing a computer to define a resolution enhancement parameter;

computer readable code for causing a computer to define an image size parameter;

computer readable code for causing a computer to define at least one offset register;

computer readable code for causing a computer to define at least one pixel prescaler responsive to the at least one offset register;

computer readable code for causing a computer to define an optimized position signal by multiplying the raw position signal by the resolution enhancement and the image size parameters and dividing by the at least one pixel prescaler; and computer readable code for causing a computer to activate a plurality of imaging devices in accordance with the optimized position signal and the image data, so as to achieve optimized application of the image corresponding to the image data.

32. A program storage medium readable by a computer, tangibly embodying a program of instructions executable by the computer to perform method steps for the optimized an application of image data, the method steps comprising:

generating a raw position signal;

defining a resolution enhancement parameter;

defining an image size parameter;

defining at least one offset register;

defining at least one pixel prescaler responsive to the at least one offset register;

generating an optimized position signal by multiplying the raw position signal by the resolution enhancement and the image size parameters and dividing by the at least one pixel prescaler; and activating a plurality of imaging devices in accordance with the optimized position signal and the image data, so as to achieve optimized application of the image corresponding to the image data.

* * * * *